United States Patent
Glugla et al.

(10) Patent No.: US 11,845,310 B2
(45) Date of Patent: Dec. 19, 2023

(54) SYSTEMS AND METHODS FOR TIRE WARMUP AND VEHICLE LAUNCH OPTIMIZATION

(71) Applicant: Ford Global Technologies, LLC, Dearborn, MI (US)

(72) Inventors: Christopher Paul Glugla, Macomb, MI (US); Gopichandra Surnilla, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 609 days.

(21) Appl. No.: 16/164,471

(22) Filed: Oct. 18, 2018

(65) Prior Publication Data
US 2020/0122534 A1    Apr. 23, 2020

(51) Int. Cl.
*B60C 23/20* (2006.01)
*B60C 99/00* (2006.01)
*B60C 23/04* (2006.01)
*B60C 19/00* (2006.01)

(52) U.S. Cl.
CPC ........ *B60C 99/003* (2013.01); *B60C 23/0476* (2013.01); *B60C 23/20* (2013.01); *B60C 2019/004* (2013.01)

(58) Field of Classification Search
CPC ......... B60W 30/18027; B60W 30/186; B60W 40/12; B60W 2520/28; B60W 40/068; B60C 99/003; B60C 23/0476; B60C 23/20; B60C 2019/004; B60Y 2300/186; B62B 2301/0467; B60T 2240/03; B60T 2250/00; B60T 1/02; B60T 8/26

USPC .......................................................... 701/1
See application file for complete search history.

(56) References Cited

U.S. PATENT DOCUMENTS

| | | | |
|---|---|---|---|
| 6,406,103 B1 * | 6/2002 | Elliott | B60T 8/26 303/20 |
| 8,175,785 B2 * | 5/2012 | Turski | B60W 30/18027 701/84 |
| 9,387,851 B2 | 7/2016 | Klier et al. | |
| 9,676,331 B2 | 6/2017 | Hartmann | |

(Continued)

FOREIGN PATENT DOCUMENTS

| DE | 10256726 A1 | 6/2004 |
|---|---|---|
| DE | 102008047750 A1 | 5/2009 |

(Continued)

OTHER PUBLICATIONS

Anahita Emami, Physics-Based Friction Model with Potential Application in Numerical Models for Tire-Road Traction, Oct. 2017, Proceedings of the ASME 2017 Dynamic Systems and Control Conference (Year: 2017).*

*Primary Examiner* — Elaine Gort
*Assistant Examiner* — Matthias S Weisfeld
(74) *Attorney, Agent, or Firm* — Vincent Mastrogiacomo; McCoy Russell LLP

(57) ABSTRACT

Methods and systems are provided for warming vehicle tires prior to a vehicle launch event. In one example, a method may include, in response to an initiation of a burn out event while locking non-driven wheel brakes, adjusting a spinning of driven wheels based on vehicle performance parameters measured during a previous vehicle launch. In this way, a vehicle controller may control the tire warming to increase tire traction while reducing tire wear.

19 Claims, 5 Drawing Sheets

(56) References Cited

U.S. PATENT DOCUMENTS

| | | | | |
|---|---|---|---|---|
| 9,731,721 | B1* | 8/2017 | Wilder | B60T 8/266 |
| 9,764,609 | B2* | 9/2017 | Handzel, Jr. | B60C 99/003 |
| 2010/0161188 | A1* | 6/2010 | Turski | G06F 17/00 701/67 |
| 2011/0175439 | A1* | 7/2011 | Mlynarczyk | B60T 13/68 303/20 |
| 2016/0297418 | A1* | 10/2016 | Zhang | B60W 20/1088 |
| 2017/0132334 | A1 | 5/2017 | Levinson et al. | |
| 2018/0073891 | A1 | 3/2018 | Max et al. | |

FOREIGN PATENT DOCUMENTS

| | | | | |
|---|---|---|---|---|
| DE | 102013019804 A1 | | 5/2015 | |
| EP | 3176603 A1 | | 6/2017 | |
| WO | WO 2014/048947 | * | 4/2014 | B60W 30/18 |
| WO | WO 2014/048947 A1 | * | 4/2014 | B60W 30/18 |
| WO | WO 2018/166862 | * | 9/2018 | B60T 8/175 |
| WO | WO 2018/166862 A1 | * | 9/2018 | B60T 8/175 |
| WO | WO-2018166862 A1 | * | 9/2018 | B60K 28/16 |

\* cited by examiner

SYSTEMS AND METHODS FOR TIRE WARMUP AND VEHICLE LAUNCH OPTIMIZATION

FIELD

The present description relates generally to methods and systems for controlling a vehicle system for tire warmup.

BACKGROUND/SUMMARY

Some performance vehicles, such as vehicles used in drag or track racing, may include features for enhancing racing capabilities. For example, rear tires of the vehicle may be heated in order to promote traction for subsequent races or laps. This is typically done through a burn out, which includes spinning the rear (driven) tires on pavement until they become hot due to friction while the vehicle is substantially held in place by front (non-driven) brakes. This also cleans the rear tires of debris. If the tires are not sufficiently warmed, they may have reduced grip, resulting in increased tire slip during a vehicle launch, for example. However, excessive heating reduces also traction and increases tire wear. Therefore, controlling a duration of time for which the burn out is performed may help reduce overwarming and extend a life of the rear tires while providing increased traction for a fast launch.

Other attempts to address controlling the burn out duration include providing a timer for the burn out. One example approach is shown by Elliott et al. in U.S. Pat. No. 6,406,103. Therein, a driver determines a desired duration for the burn out and manually sets the timer. The timer begins once the engine reaches a preset speed while the burn out is performed. Upon the timer elapsing, the front brakes are disengaged to allow the vehicle to move forward, thus ending the burn out.

The inventors herein have recognized the above aspects as well as potential issues with such systems. As one example, the desired duration selected by the driver may result in under-warming or over-warming of the tires. For example, the driver may incorrectly judge how much warming will result in optimal traction, which may lead to slow vehicle launches due to reduced traction. Further, if the desired duration is longer than needed for optimal traction, the life of the rear tires may be reduced through additional wear. As another example, although the engine speed activates the timer, the driver controls the engine speed, and thus a rotational speed of the rear tires during the burn out. As a result of engine speed variations during the burn out, two burn out events performed for the same duration may result in a different amount of tire warming. Further still, the driver may not be able to accurately correlate the burn out duration and rear wheel rotational speed to vehicle performance parameters during the subsequent vehicle launch (e.g., increased or decreased tire slip, increased or decreased vehicle speed, etc.). As a result, the driver may not know how to adjust the burn out duration and/or rear wheel rotational speed for a subsequent burn out to obtain a faster vehicle launch. Further still, the pavement conditions can also affect the amount of time needed for the burn out.

In one example, the issues described above may be addressed by a method comprising: while locking non-driven wheel brakes, adjusting a spinning of driven wheels based on a vehicle performance during a previous vehicle launch. In this way, a burn out duration and rear wheel rotational speed may be precisely controlled for optimally warming rear tires.

As one example, adjusting the spinning of the driven (e.g., rear) wheels includes adjusting at least one of a burn out duration (e.g., a duration of the spinning) and a rotational speed of the driven wheels during the spinning, and the vehicle performance during the previous vehicle launch includes an amount of tire slip, a lateral vehicle speed, and a yaw rate of the vehicle measured during the previous vehicle launch. For example, higher tire slip values, lateral vehicle speeds, and yaw rates may indicate poorer rear tire traction, such as due to insufficient tire warming. Thus, in one example, the rotational speed and/or the burn out duration may be increased to reduce the tire slip, the lateral vehicle speed, and the yaw rate during a subsequent vehicle launch. The amount of tire slip may be inferred based on time-matched longitudinal vehicle speed values obtained from a wheel speed sensor, which is affected by tire slip, and a radar odometry sensor, which is not affected by tire slip. The lateral vehicle speed and the yaw rate may also be measured by the radar odometry sensor. Thus, a controller of the vehicle may precisely adjust and control the burn out duration and the driven wheel rotational speed based on vehicle performance measurements, eliminating an effect of driver judgement and skill on the burn out and resulting tire warming. In this way, the burn out duration and driven wheel speed, and thus the tire warm up, may be optimized for increasing rear tire traction while reducing rear tire wear, resulting in efficient vehicle launches while increasing rear tire life.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for warming up tires of a vehicle. The vehicle, such as the vehicle system shown in FIG. 1, may be a performance vehicle that includes a line-lock feature for holding brake pressure at non-driven wheels of the vehicle while allowing driven wheels to spin. For example, a braking system may include one or more valves that may be actuated by a vehicle controller to maintain the brake pressure at the non-driven wheels while releasing the brake pressure at the driven wheels when the line-lock feature is activated, such as the example braking system shown in FIG. 2. During the burn out, the controller may spin the driven wheels at a desired rotational speed for a desired duration, such as according to the example method of FIG. 3. The controller may determine the desired rotational speed and the desired duration based on vehicle performance parameters measured during a vehicle launch following a burn out, such as according to the example method of FIG. 4. FIG. 5 shows an example timeline for performing a first burn out prior to a first vehicle launch event and adjusting burn out parameters for a second, subsequent burn out based on vehicle performance parameters measured during the first vehicle launch event. In this way, the burn out may be precisely controlled using vehicle performance feedback in order to increase tire traction while reducing tire wear.

Figure 1:
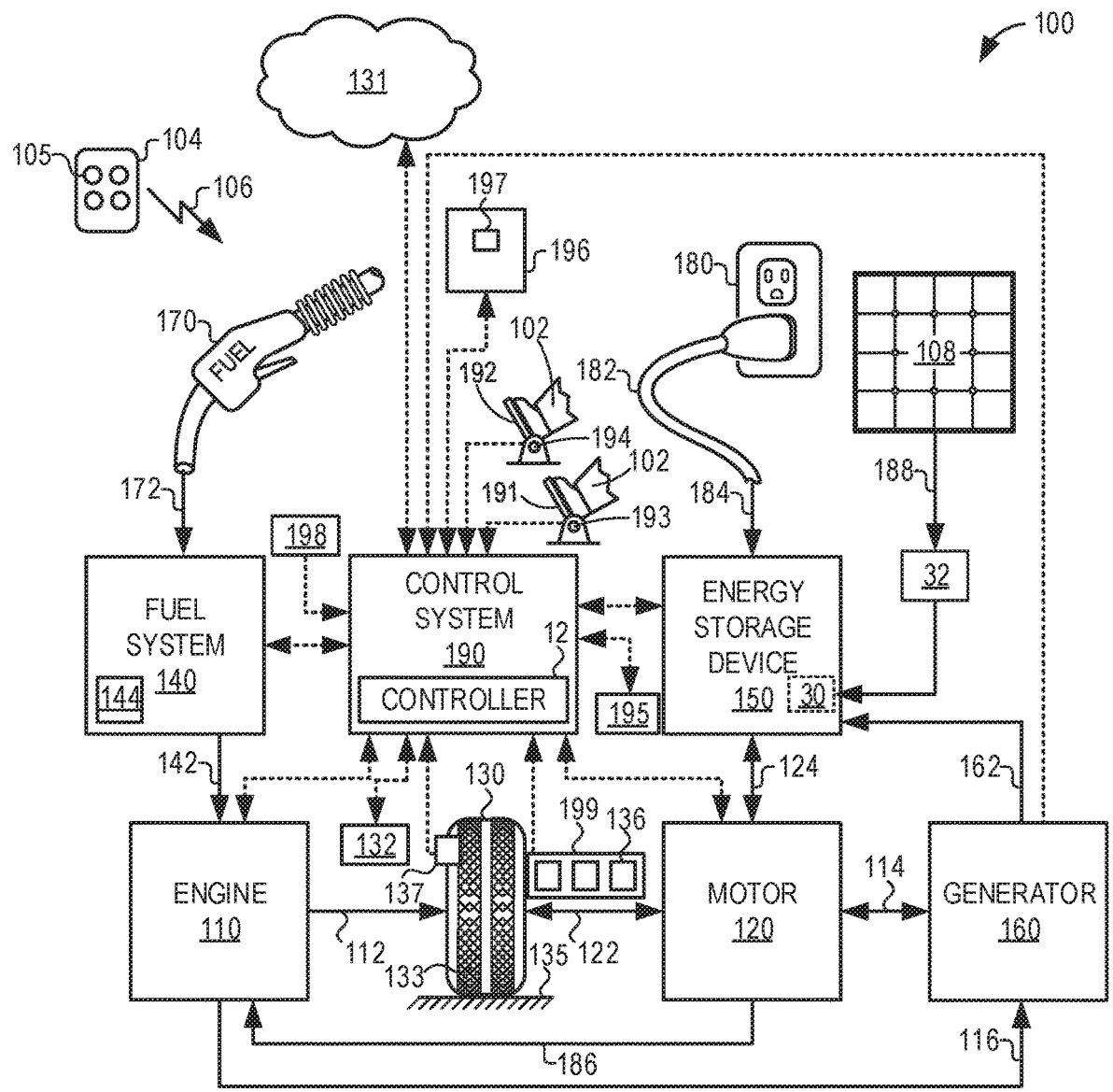
FIG. 1 schematically shows an example vehicle system.

FIG. 1 illustrates an example vehicle system 100. Vehicle system 100 includes a fuel burning engine 110 and a motor 120. As a non-limiting example, engine 110 comprises an internal combustion engine and motor 120 comprises an electric motor (e.g., electric machine). Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle having vehicle system 100 may be referred to as a hybrid electric vehicle (HEV). However, in other examples, vehicle system 100 may be a conventional vehicle having only engine 110 (and not motor 120) or an electric vehicle having only motor 120 (and not engine 110).

Vehicle system 100 may utilize a variety of different operational modes depending on operating conditions encountered by the vehicle propulsion system. Some of these modes may enable engine 110 to be maintained in an off state (e.g., set to a deactivated state), where combustion of fuel at the engine is discontinued and the engine is at rest. For example, under select operating conditions, motor 120 may propel the vehicle via a wheel 130, as indicated by an arrow 122, while engine 110 is deactivated.

During other operating conditions, engine 110 may be set to a deactivated state (as described above) while motor 120 may be operated to charge an energy storage device 150. For example, motor 120 may receive wheel torque from wheel 130, as indicated by arrow 122, and may convert the kinetic energy of the vehicle to electrical energy for storage at energy storage device 150, as indicated by an arrow 124. This operation may be referred to as regenerative braking of the vehicle. Thus, motor 120 may function as a generator in some examples. However, in other examples, a generator 160 may instead receive wheel torque from wheel 130 and may convert the kinetic energy of the vehicle to electrical energy for storage at energy storage device 150, as indicated by an arrow 162. As an additional example, motor 120 may use energy stored at energy storage device 150 to crank engine 110 in a starting operation, as indicated by an arrow 186. Energy storage device may include one or more batteries. For example, energy storage device may include one or more traction batteries and/or one or more starting, lighting, and ignition (SLI) batteries.

During still other operating conditions, engine 110 may be operated by combusting fuel received from a fuel system 140, as indicated by an arrow 142. For example, engine 110 may be operated to propel the vehicle via wheel 130, as indicated by an arrow 112, while motor 120 is deactivated. During other operating conditions, both engine 110 and motor 120 may each be operated to propel the vehicle via wheel 130, as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle system 100 may be configured as a series type vehicle propulsion system, whereby the engine does not directly propel the drive wheels. Rather, engine 110 may be operated to power motor 120, which may in turn propel the vehicle via wheel 130, as indicated by arrow 122. For example, during select operating conditions, engine 110 may drive generator 160, as indicated by an arrow 116, which may in turn supply electrical energy to one or more of motor 120, as indicated by an arrow 114, or energy storage device 150, as indicated by arrow 162. As another example, engine 110 may be operated to drive motor 120, which may in turn function as a generator to convert the engine output to electrical energy. The electrical energy may be stored at energy storage device 150 for later use by the motor, for example.

Fuel system 140 may include one or more fuel storage tanks 144 for storing fuel on-board the vehicle, one or more fuel pumps, and one or more fuel rails. For example, fuel tank 144 may store one or more liquid fuels, including (but not limited to) gasoline, diesel, and alcohol fuels. In some examples, the fuel may be stored on-board the vehicle as a blend of two or more different fuels. For example, fuel tank 144 may be configured to store a blend of gasoline and ethanol (such as E10, E85, etc.) or a blend of gasoline and methanol (such as M10, M85, etc.), whereby these fuels or fuel blends may be delivered to engine 110 as indicated by arrow 142. Still other suitable fuels or fuel blends may be supplied to engine 110, where they may be combusted to produce an engine output (e.g., torque). The engine output may be utilized to propel the vehicle (as indicated by arrow 112) or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

A control system 190, including a controller 12, may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback.

Control system 190 may receive an indication of an operator requested output of the vehicle propulsion system from a vehicle operator 102. For example, control system 190 may receive sensory feedback from a pedal position sensor 194 concerning a position of an accelerator pedal 192 that may be depressed by vehicle operator 102. Similarly, control system 190 may receive sensory feedback from a pedal position sensor 193 concerning a position of a brake pedal 191 that may be depressed by vehicle operator 102. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or a smartphone-based system where a user's telephone sends data to a server and the server communicates with the vehicle to start the engine.

Energy storage device 150 may periodically receive electrical energy from a power source 180 residing external to the vehicle (e.g., an external stationary power grid that is not part of the vehicle), as indicated by an arrow 184. As a non-limiting example, vehicle system 100 may be configured as a plug-in HEV, whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle system 100 is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

In still other examples, vehicle system 100 may include one or more solar cells 108, operative to convert incident solar radiation into electrical energy. The solar cells 108 are electrically coupled to a solar battery 30 via a charge controller 32. Solar cells 108 and charge controller 32 are operative to supply electrical current for charging solar battery 30. In this example, solar battery 30 is housed within and electrically coupled to energy storage device 150, but in other configurations, solar battery 30 may be electrically coupled to energy storage device 150 while being housed separately. In still other configurations, solar battery 30 may be both physically and electrically isolated from energy storage device 150. Solar battery 30 may thus be configured to provide or receive charge from energy storage device 150, depending on engine operating conditions, charge status, and battery requirement(s). In some examples, solar battery 30 may be configured to independently supply charge directly to vehicle actuators and devices. Further, in some examples, charge controller 32 may be used to directly supply power to vehicle actuators and devices without charge first being stored in solar battery 30.

Solar cells 108 may be mounted on any convenient exterior surface of the vehicle, for example, a vehicle roof, hood, trunk, etc. However, solar cells 108 may additionally or alternatively be mounted on the interior of the vehicle, such as on a dashboard or other passenger compartment surface in proximity to a window or interior light bulb. In general, the solar cells are operative to convert solar radiation incident thereon into electrical energy. In some embodiments, solar cells 108 may comprise a series of photovoltaic cells formed from an amorphous semi-conductor material, such as silicon. Additionally, individual photovoltaic cells may be interconnected so as to provide a constant flow of electrical energy to a common output cable 188, which electrically couples solar cells 108 to charge controller 32 and solar battery 30. In this way, solar cells 108 may generate electrical energy with which to propel the vehicle or power one or more vehicle actuators and devices.

Fuel system 140 may periodically receive fuel from a fuel source residing external to the vehicle. As a non-limiting example, vehicle system 100 may be refueled by receiving fuel via a fuel dispensing device 170, as indicated by an arrow 172. In some examples, fuel tank 144 may be configured to store the fuel received from fuel dispensing device 170 until it is supplied to engine 110 for combustion. In some examples, control system 190 may receive an indication of the level of fuel stored in fuel tank 144 via a fuel level sensor. The level of fuel stored in fuel tank 144 (e.g., as identified by the fuel level sensor) may be communicated to the vehicle operator, for example, via a fuel gauge or indication in a vehicle instrument panel (e.g., message center) 196.

Vehicle system 100 may also include a radar odometry sensor 198 and an electronic stability control system 199, including lateral and/or longitudinal velocity sensors and/or a yaw rate sensor. As used herein, "longitudinal velocity" refers to a velocity of vehicle system 100 in a lengthwise direction, e.g., in a direction of vehicle travel, and "lateral velocity" refers to a velocity of vehicle system 100 in a sideways direction, e.g., perpendicular to the direction of vehicle travel. Electronic stability control system 199 may further include a wheel speed sensor 136. A longitudinal velocity value may be determined from output of wheel speed sensor 136, for example. Radar odometry sensor 198 may include one or more radar sensors and may be configured to directly measure a velocity of the vehicle using the Doppler effect. Further, radar odometry sensor 198 may be configured to estimate lateral velocity, longitudinal velocity, and yaw rate. Thus, in some examples, the lateral and/or longitudinal velocity sensors and/or the yaw rate sensor of the electronic stability control system 199 may be omitted. Further, in some examples, radar odometry sensor 198 may be included in electronic stability control system 199.

The vehicle instrument panel 196 may include indicator light(s) and/or a text-based display in which messages are displayed to an operator. The vehicle instrument panel 196 may also include various input devices for receiving an operator input, such as buttons, touch screens, voice input/recognition, etc. For example, the vehicle instrument panel 196 may include a line-lock button 197, which may be manually actuated or pressed by the vehicle operator to initiate a line-lock feature. However, in other examples, line-lock button 197 may be positioned elsewhere in the vehicle, such as on a steering wheel or a shifter. As will be further described herein with respect to FIGS. 2 and 3, when engaged, the line-lock feature locks a brake line to maintain brake fluid pressure on non-driven wheel brakes after the brake pedal 191 is released for performing a burn out to warm up a tire 133 of each driven wheel 130. For example, when the line-lock button 197 is actuated by the vehicle operator to engage the line-lock feature, the non-driven wheel brakes may prevent front wheels 130 from spinning while the tire 133 of each driven wheel 130 spins against a surface 135 in response to a depression of accelerator pedal 192 by the vehicle operator 102, creating friction that warms up the driven wheel tires and deposits a layer of the tires (e.g., of rubber) on the surface 135. The surface may be pavement, for example. In some examples, the surface for performing the burn out may be wet with water, in what is referred to as a water box.

One or more tire pressure monitoring system (TPMS) sensors 137 may be coupled to one or more tires 133. TPMS sensor 137 may comprise an electronic system configured to monitor air pressure inside each tire 133. Such information may be used to report real-time tire pressure information to the operator of the vehicle, such as via a gauge, a pictogram display, or warning light, for example. While only one wheel 130 is illustrated in FIG. 1, it may be understood that the vehicle may include four wheels. Herein, wheels that transfer torque (from the engine 110 and/or the motor 120) to propel the vehicle are referred to as driven wheels, whereas wheels that do not transfer torque to propel the vehicle are referred to as non-driven wheels.

As an example, TPMS sensor 137 may comprise what is referred to as a direct TPMS sensor. In such an example, TPMS sensors may be provided for each tire, and each pressure sensor may report tire pressure to the controller 12. In some examples, TPMS sensor 137 may enable a determination of tire temperature based on the relationship $PV=nRT$ (e.g., the ideal gas law), where P is pressure, V is volume, n is the amount of gas in moles, R is the universal gas constant, and T is absolute temperature of the gas. Thus, controller 12 may determine the tire temperature based on the tire pressure measurement from TPMS sensor 137.

In another example, the TPMS may comprise an indirect TPMS sensor, which, rather than using physical pressure sensors, may infer tire pressure by monitoring individual wheel speeds via wheel speed sensor(s) 136 and other signals available outside the tire itself.

Control system 190 may be communicatively coupled to other vehicles or infrastructures using appropriate communications technologies. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles can be either directly communicated between vehicles or can be multi-hop. In some examples, longer range communications (e.g., WiMax) may be used in place of or in conjunction with V2V or V2I2V to extend the coverage area by a few miles. In still other examples, vehicle control system 190 may be communicatively coupled to other vehicles or infrastructures via wireless network 131 and the Internet (e.g., the Cloud).

Vehicle system 100 may also include an on-board navigation system 132 (for example, a Global Positioning System, GPS) that an operator of the vehicle may interact with. The navigation system 132 may include one or more location sensors for assisting in estimating vehicle speed, vehicle altitude, vehicle position/location, etc. This information may be additionally used to infer engine operating parameters, such as local barometric pressure. As discussed above, control system 190 may further be configured to receive information via the internet or other communication networks. Information received from the GPS may be cross-referenced to information available via the Internet to determine local weather conditions, local vehicle regulations, etc.

Control system 190, including controller 12, receives information from the plurality of sensors of the vehicle system (various examples of which are described herein) and sends control signals to a plurality of actuators (various examples of which are described herein). As one example, the sensors may include accelerator pedal position sensor 194, brake pedal position sensor 193, radar odometry sensor 198, TPMS sensor 137, and wheel speed sensor 136. Other sensors, such as pressure, temperature, air/fuel ratio, and composition sensors may be coupled to various locations in the vehicle system 100. As another example, the actuators may include a fuel injector, an engine intake throttle, etc. Controller 12 of control system 190 may include a microprocessor that receives input data from the various sensors, processes the input data, and triggers the actuators in response to the processed input data based on instruction or code programmed therein corresponding to one or more routines. An example control routine is described herein with regard to FIG. 3. In one example, based on input from radar odometry sensor 198 and wheel speed sensor 136, the controller may adjust a burn out time and/or rotational speed for warming the rear tires.

Figure 2:
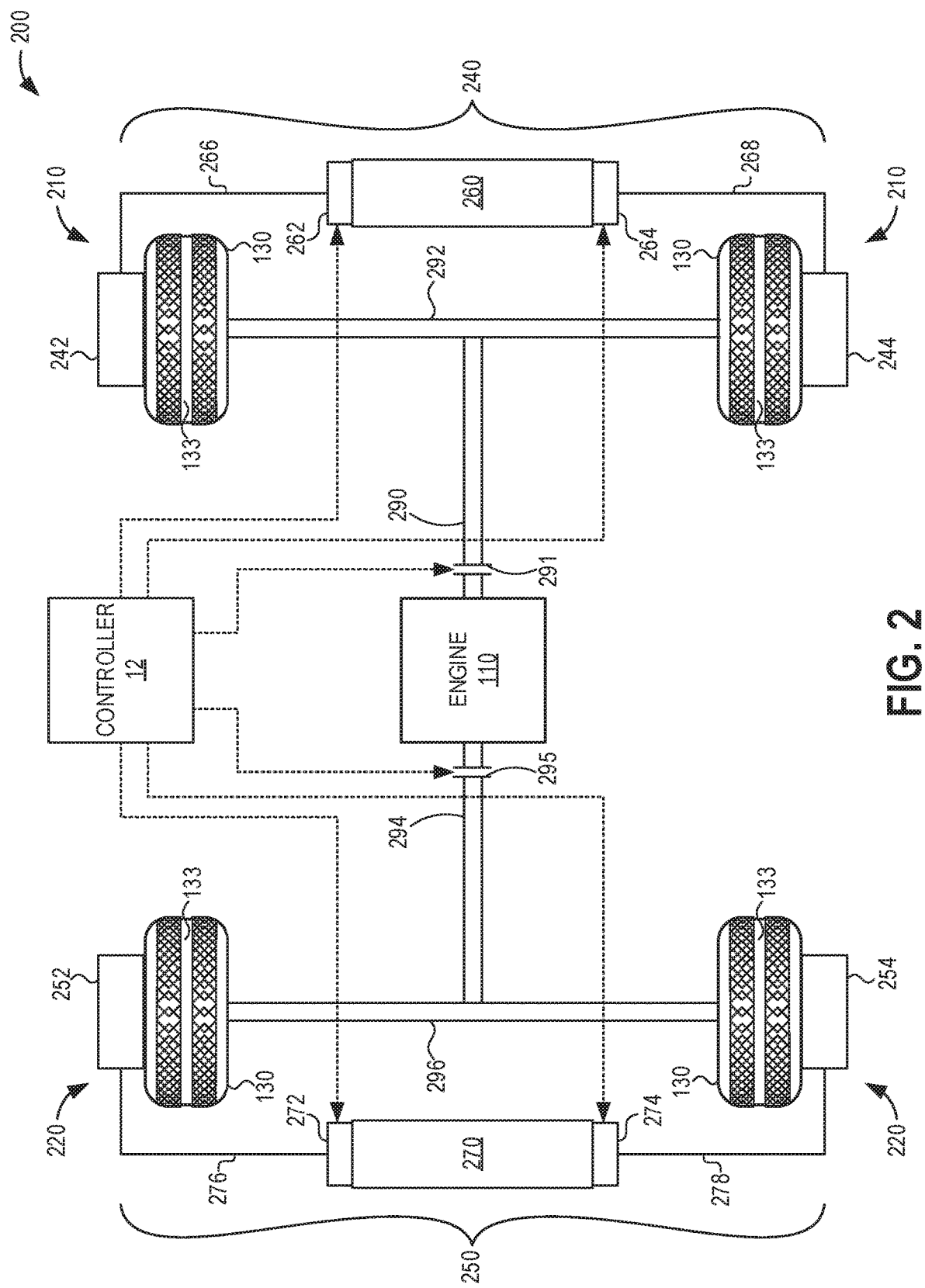
FIG. 2 schematically illustrates a vehicle braking system.

Next, FIG. 2 schematically shows an example vehicle braking system 200, which may be included in vehicle system 100 shown in FIG. 1. Thus, the components of FIG. 2 that function the same as components of FIG. 1 are numbered the same and may not be reintroduced. Braking system 200 is illustrated for a four-wheel vehicle, although in other examples, more than four or fewer than four wheels may be included. For example, braking system 200 may be attached to a vehicle chassis having four wheels 130. Two wheels 130 (and the corresponding tires 133) comprise front wheels 210, and two wheels 130 (and the corresponding tires 133) comprise rear wheels 220.

A first set of brakes 240 is coupled to the front wheels 210. The first set of brakes 240, also referred to as the front wheel brakes herein, includes brake modules 242 and 244, each of the brake modules 242 and 244 coupled to one of the wheels 130 of the front wheels 210. A second set of brakes 250 is coupled to the rear wheels 220. The second set of brakes 250, also referred to as the rear wheel brakes herein, includes brake modules 252 and 254, each of the brake modules 252 and 254 coupled to one of the wheels 130 of the rear wheels 220. In the example of FIG. 2, the brake modules 242, 244, 252, and 254 are hydraulic brake modules and may include, for example, disc brakes, drum brakes, or electric brakes. Hydraulic fluid (e.g., brake fluid) is supplied to the first set of brakes 240 via a first hydraulic module (or cylinder) 260, and hydraulic fluid is supplied to the second set of brakes 250 via a second hydraulic module (or cylinder) 270. For example, first hydraulic module 260 provides hydraulic fluid to brake module 242 via a brake line 266 and to brake module 244 via a brake line 268. Similarly, second hydraulic module 270 provides hydraulic fluid to brake module 252 via a brake line 276 and to brake module 254 via a brake line 278.

A valve system is positioned between the first and second hydraulic modules and the corresponding brake module. The illustrated valve system includes four valves 262, 264, 272 and 274 that control the distribution of the hydraulic fluid from the hydraulic modules to each brake module. For example, the valve system is configured to selectively, such as in response to a control signal from controller 12, at least partially disconnect the hydraulic modules from the corresponding brake modules. In the example shown in FIG. 2, valve 262 controls the distribution of hydraulic fluid between hydraulic module 260 and brake module 242, valve 264 controls the distribution of hydraulic fluid between hydraulic module 260 and brake module 244, valve 272 controls the distribution of hydraulic fluid between hydraulic module 270 and brake module 252, and valve 274 controls the distribution of fluid between hydraulic module 270 and brake module 254. In this way, brakes can be selectively turned on and off on an individual wheel or set of wheels.

Controller 12 may be hard-wired or wirelessly connected to valves 262, 264, 272 and 274. In one example, valves 262, 264, 272 and 274 include solenoids and are actuated upon receiving an electric control signal from controller 12. For example, in response to a vehicle operator requesting the line-lock feature (e.g., via line-lock button 197 shown in FIG. 1), the controller may adjust valves 262, 264, 272 and 274 accordingly in order to maintain hydraulic fluid pressure at one set of brakes (e.g., the first set of brakes 240) while preventing or releasing hydraulic fluid pressure at the other set of brakes (e.g., the second set of brakes 250), as will be further described below with respect to FIG. 3.

Further, FIG. 2 schematically shows an all-wheel drive vehicle, in which engine torque (and/or electric motor torque, such as from motor 120 shown in FIG. 1) may be supplied to the front wheels 210 via a first drive shaft 290 and a front axle 292 and supplied to the rear wheels 220 via a second drive shaft 294 and a rear axle 296. Note that various other components, such as a transmission, a transfer box, and one or more differentials may be included for transferring torque from engine 110 to the front wheels 210 and/or the rear wheels 220. Further, a first disconnect clutch 291 included in first drive shaft 290 between engine 110 and front axle 292 may be actuated to selectively decouple front axle 292, and thus the front wheels 210, from engine 110. For example, controller 12 may transmit a control signal to disengage disconnect clutch 291, thereby preventing torque transfer to front wheels 210. In such an example, the vehicle may be operated in a rear-wheel drive mode, with the front wheels 210 functioning as non-driven wheels and the rear wheels 220 operating as driven wheels (e.g., with second disconnect clutch 295 engaged). The controller may transmit a different control signal to engage disconnect clutch 291, thereby enabling torque transfer to front wheels 210 to operate the front wheels as driven wheels. Similarly, a second disconnect clutch 295 included in second drive shaft 294 between engine 110 and rear axle 296 may be actuated to selectively decouple rear axle 296, and thus the rear wheels 220, from engine 110. For example, controller 12 may transmit a control signal to disengage disconnect clutch 295, thereby preventing torque transfer to rear wheels 220. In such an example, the vehicle may be operated in a front-wheel drive mode, with the rear wheels 220 functioning as non-driven wheels and the front wheels 210 operating as driven wheels (e.g., with first disconnect clutch 291 engaged). The controller may transmit a different control signal to engage disconnect clutch 295, thereby enabling torque transfer to rear wheels 220 to operate the rear wheels as driven wheels.

Thus, the vehicle may be operated in an all-wheel drive mode (with both first clutch 291 and second clutch 295 engaged), a front-wheel drive mode (with first clutch 291 engaged and second clutch 295 disengaged), and a rear-wheel drive mode (with first clutch 291 disengaged and second clutch 295 engaged). The controller may switch between the different drive modes based on input received from a vehicle operator (e.g., via a shifter) and/or according to executable instructions stored in non-transitory memory. However, in other examples, the vehicle may be a rear-wheel drive vehicle, in which the rear wheels 220 are driven wheels and the front wheels 210 are non-driven wheels. For example, when the vehicle is a rear-wheel drive vehicle, first drive shaft 290, first disconnect clutch 291, and second disconnect clutch 295 may be omitted.

In this way, when the vehicle is operated in a two-wheel drive mode (e.g., the rear-wheel drive mode or the front-wheel drive mode) with the line-lock feature enabled, the non-driven wheels may be held in place by the brake pressure at the non-driven wheel brakes while the driven wheels are spun at a non-zero speed due to a lack of brake pressure at the driven wheel brakes.

Figure 3:
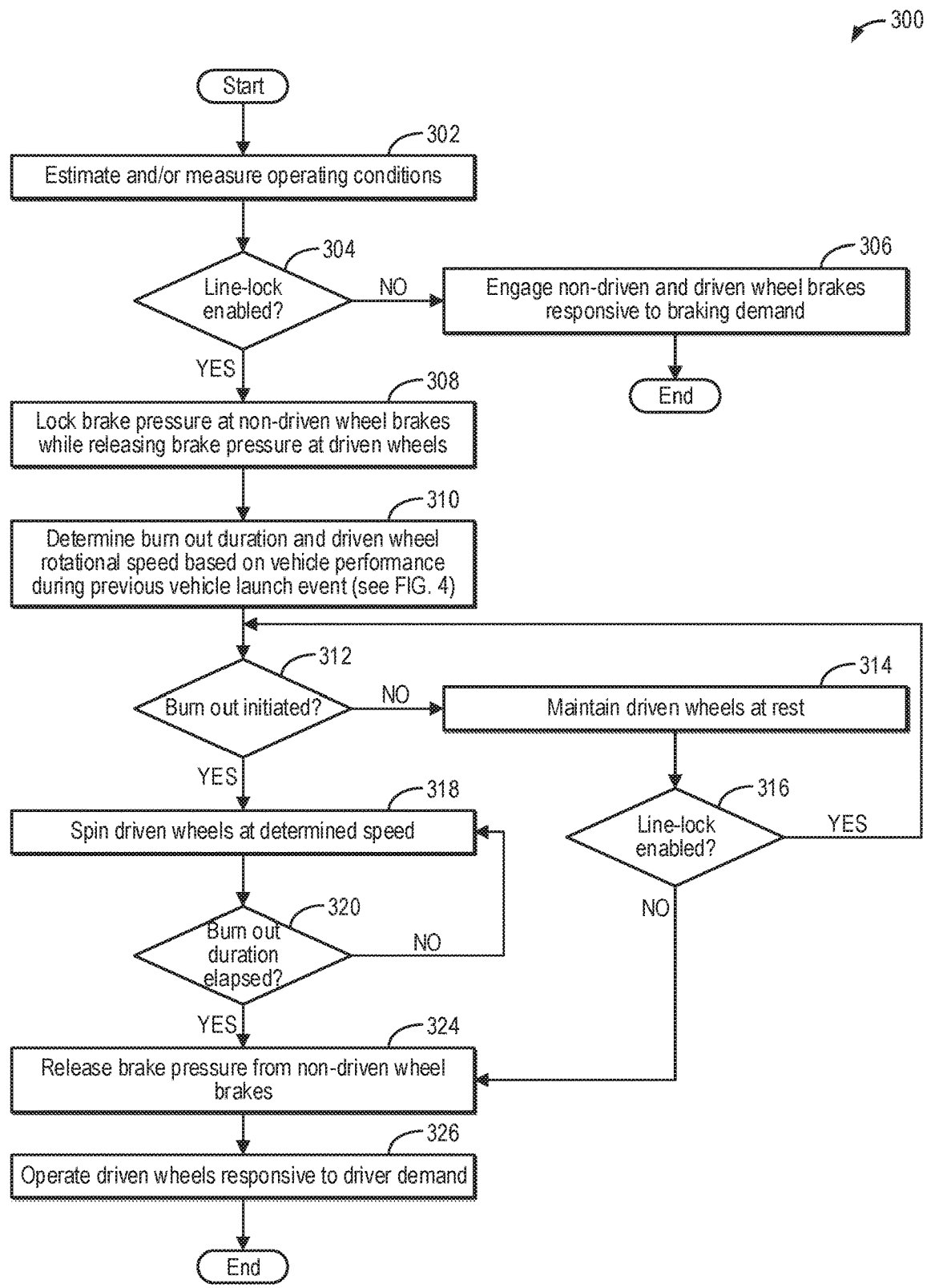
FIG. 3 is a flow chart of an example method for performing a burn out to warm rear tires prior to a vehicle launch.

Next, FIG. 3 shows an example method 300 for performing a burn out in a vehicle, which may be vehicle system 100 shown in FIG. 1. For example, method 300 includes performing the burn out with a driven wheel rotational speed and a burn out duration (e.g., an amount of time over which the burn out is performed) that have been optimized for warming up tires of the vehicle while reducing tire wear. Instructions for carrying out method 300 and the rest of the methods included herein may be executed by a controller included in a control system (e.g., controller 12 of FIGS. 1-2) based on instructions stored on a memory of the controller and in conjunction with signals received from sensors of the vehicle system, such as the sensors described above with reference to FIG. 1. The controller may employ actuators of the vehicle system to adjust vehicle operation according to the methods described below.

At 302, method 300 includes estimating and/or measuring operating conditions. The operating conditions may include, for example, engine speed and load, vehicle speed, accelerator pedal position (e.g., of accelerator pedal 192 of FIG. 1), brake pedal position (e.g., of brake pedal 191 of FIG. 1), a steering wheel angle, tire pressure from a tire pressure sensor (e.g., TPMS sensor 137 of FIG. 1), etc. For example, the vehicle speed may be measured via a wheel speed sensor (e.g., wheel speed sensor 136 of FIG. 1) and/or by a radar odometry sensor (e.g., radar odometry sensor 198 of FIG. 1). Further, the controller may estimate tire temperature based on the measured tire pressure (e.g., via the ideal gas law). The operating conditions may further include ambient conditions, such as ambient temperature, pressure, and humidity, as well as a vehicle operating time during a current key-cycle (e.g., since a vehicle key-on event, when the vehicle is powered on), a number of burn outs performed during the current key-cycle, an amount of time since the previous burn out, a number of vehicle launch events during the current key-cycle, an amount of time since the previous vehicle launch event, etc.

At 304, method 300 includes determining if line-lock is enabled. For example, a vehicle operator may enable the line-lock feature by depressing a line-lock button (e.g., line-lock button 197 of FIG. 1). The line-lock feature may be included in performance vehicles that may be used for drag racing, for example. Therefore, the line-lock feature may not be included in vehicles that are not meant to perform burn outs, such as non-performance vehicles, front-wheel drive vehicles, etc. For example, the line-lock feature may include both software features, such as executable instructions or code stored on a memory of the controller, as well as physical actuators for performing the line-lock in response to the executable instructions or code (e.g., valves 262, 264, 272 and 274 of braking system 200 of FIG. 2). Therefore, vehicles equipped with the line-lock feature include the executable instructions and the physical actuators for performing the line-lock, and vehicles not equipped with the line-lock feature may not include the executable instructions for performing the line-lock. Vehicles not equipped with the line-lock feature may not include the physical actuators for performing the line-lock in addition to not including the executable instructions, at least in some examples.

Further, the line-lock feature may be made available to the vehicle operator under select operating conditions. For example, the line-lock feature may be made available in response to the vehicle speed being less than or equal to a threshold speed. As one example, the threshold speed may be in a range from 0-1 mph. As another example, the line-lock feature may be available in response to the vehicle being at rest (e.g., with a speed of zero). In this way, the vehicle operator may not engage the line-lock feature while the vehicle is in motion. In a further example, the line-lock feature may be made available when the steering wheel angle is less than or equal to a threshold angle. The threshold angle may be in a range from 0-5 degrees, for example. In this way, the vehicle wheels will not be substantially turned during the line-lock and a corresponding burn out event.

If the line-lock is not enabled, method 300 proceeds to 306 and includes engaging front and rear wheel brakes responsive to a braking demand. For example, the controller may determine the braking demand based on the brake pedal position and the vehicle speed, with the braking demand increasing as the brake pedal becomes further depressed, and may adjust a brake pressure of each brake module accordingly. Following 306, method 300 may end.

If the line-lock is enabled, such as via the vehicle operator depressing the line-lock button, method 300 proceeds to 308 and includes locking brake pressure at non-driven wheel brakes while releasing brake pressure at driven wheel brakes. In some examples, the brake pressure may be applied at the non-driven wheel brakes in response to the vehicle operator depressing the brake pedal while the line-lock is enabled. In other examples, the controller may automatically apply the brake pressure at the non-driven wheel brakes without additional input from the vehicle operator (e.g., via the brake pedal) while the line-lock enabled (e.g., while operating in a line-lock mode). Further, locking brake pressure at the non-driven wheel brakes may include actuating corresponding brake system valves to fully closed positions to maintain a pre-determined brake pressure at the non-driven wheel brakes. The pre-determined brake pressure may be a first threshold, non-zero brake pressure that is calibrated during vehicle manufacture to hold the vehicle substantially stationary during a burn out, for example. For example, the controller may actuate the corresponding brake system valves to the fully closed positions in response to the brake pressure at the non-driven wheel brakes reaching or exceeding the first threshold brake pressure. As a result, brake fluid may be prevented from returning to a corresponding cylinder, thereby isolating the non-driven wheel brakes from the vehicle operator so that the brake pedal may be released with the brake pressure maintained at the front wheel brakes.

In an example where the vehicle is a rear-wheel drive vehicle, the front wheels are the non-driven wheels, and so the controller may actuate the brake system valves (e.g., valves 262 and 264 of FIG. 2) that adjust flow to the front wheel brakes (e.g., brake modules 242 and 244 of FIG. 2) to fully closed positions, preventing brake fluid from returning to the cylinder that supplies brake fluid to the front wheel brakes (e.g., first hydraulic module 260 of FIG. 2). In an example where the vehicle is an all-wheel drive vehicle, the non-driven and driven wheels may change based on a selection made by the vehicle operator or by the controller. For example, two burn out events may be performed for an all-wheel drive vehicle, with the front and rear wheels alternating between being the driven wheels and the non-driven wheels. As an example, the front wheels may be the driven wheels (and the rear wheels the non-driven wheels) for the first burn out event and the rear wheels may be the driven wheels (and the front wheels the non-driven wheels) for the second burn out event. The controller may actuate a corresponding disconnect clutch in order to disconnect one of the front wheels (e.g., via first disconnect clutch 291 of FIG. 2) and the rear wheels (e.g., via second disconnect clutch 295 of FIG. 2) from receiving engine torque. As an example, the front tires may be warmed during a first burn out event of a sequence of burn out events prior to a vehicle launch, and the rear tires may be warmed during a second burn out event of the sequence of burn out events due to wanting highest traction at the rear tires during launch. Therefore, the controller may engage or disengage the appropriate disconnect clutch based on whether it is the first burn out event or the second burn out event of the sequence.

Further, in one example, releasing the brake pressure at the driven wheel brakes includes preventing brake pressure from being applied at the driven wheel brakes. For example, prior to applying brake pressure at the non-driven wheel brakes, the controller may actuate corresponding brake system valves (e.g., valves 272 and 274 of FIG. 2 when the rear wheels are the driven wheels or valves 262 and 264 of FIG. 2 when the front wheels are the driven wheels) to fully closed positions to prevent brake fluid from flowing to the driven wheel brakes (e.g., brake modules 252 and 254 of FIG. 2 when the rear wheels are the driven wheels or brake modules 242 and 244 of FIG. 2 when the front wheels are the driven wheels) from a corresponding cylinder (e.g., second hydraulic module 270 of FIG. 2 when the rear wheels are the driven wheels or first hydraulic module 260 of FIG. 2 when the front wheels are the driven wheels). For example, the controller may actuate the corresponding brake valves to the fully closed positions in response to the brake pressure at the driven wheel brakes reaching or decreasing below a second threshold brake pressure. The second threshold brake pressure, which is lower than the first threshold brake pressure, may be a pre-determined brake pressure value below which the driven wheels will not be substantially slowed by the driven wheel brakes. For example, the second threshold brake pressure may be at or near zero. As a result, the driven wheel brakes may be isolated from the vehicle operator, and brake pressure will not be applied at the rear wheels. As another example, releasing brake pressure at the driven wheel brakes includes not locking the brake pressure at the driven wheel brakes (e.g., by not adjusting the corresponding valves) such that the brake fluid flows back to the corresponding cylinder when the vehicle operator releases the brake pedal.

Figure 4:
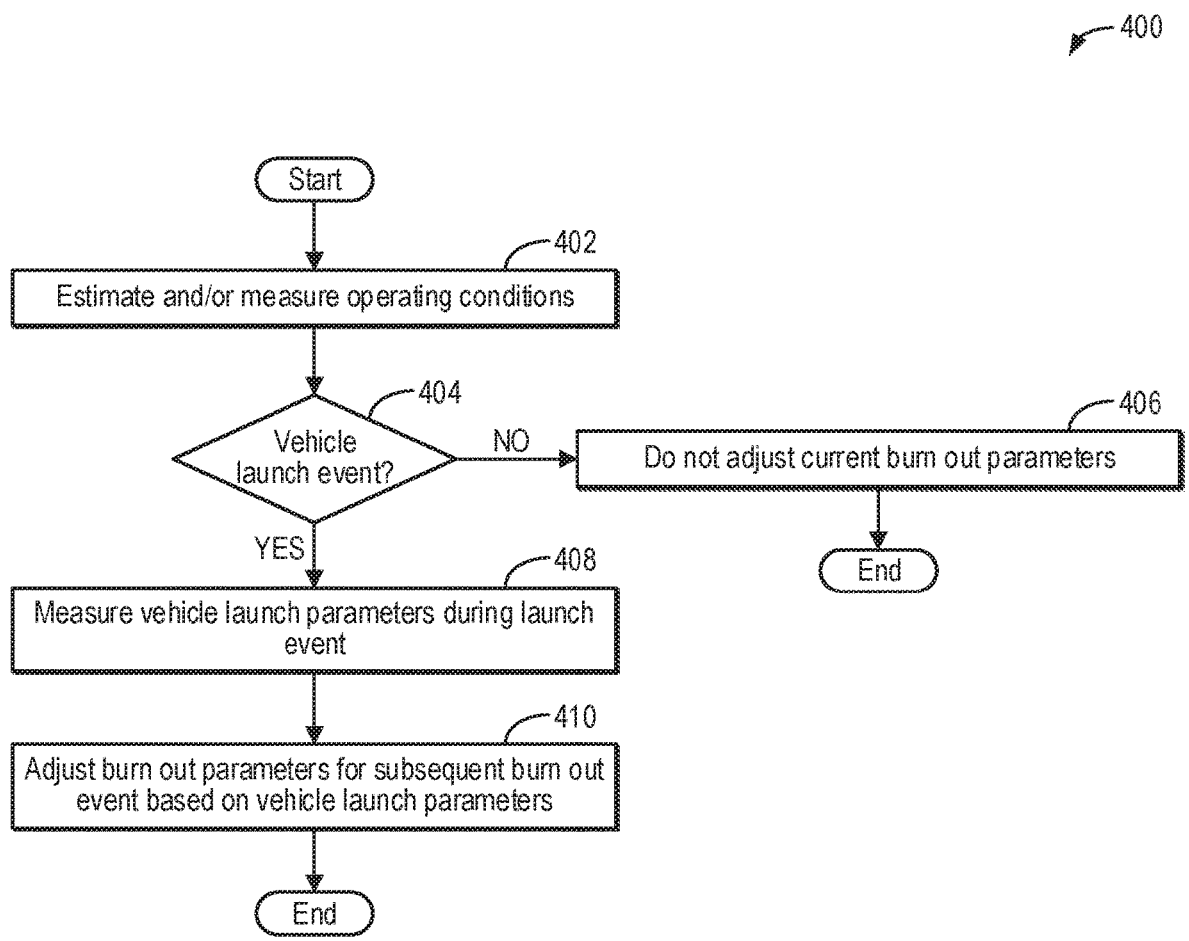
FIG. 4 is a flow chart of an example method for adjusting burn out parameters based on vehicle performance measurements obtained during a vehicle launch.
Figure 5:
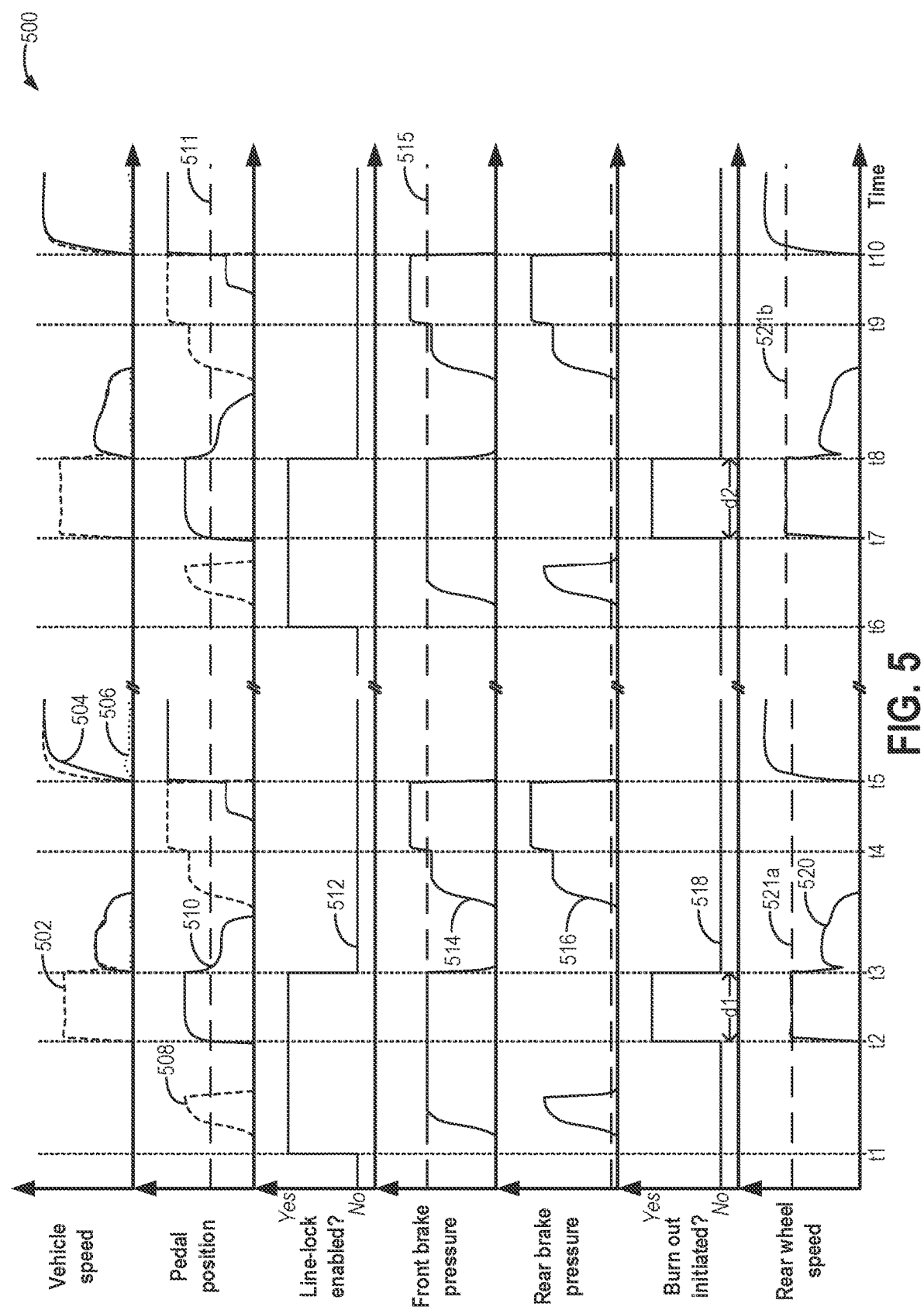
FIG. 5 is a prophetic example timeline for performing a burn out prior to a vehicle launch event and adjusting burn out parameters for a subsequent burn out based on vehicle performance parameters during the vehicle launch event.

At 310, method 300 includes determining a burn out duration and wheel rotational speed based on a vehicle performance during a previous vehicle launch event, as will be further described with respect to FIG. 4. For example, the vehicle performance may include speed measurements obtained during the previous (e.g., most recent) vehicle launch event. As an example, increased tire slip due to lower tire traction during the previous vehicle launch event, which may be inferred based on a first vehicle speed measurement obtained from a wheel speed sensor and a second vehicle speed measurement obtained from a radar odometry sensor, may result in a longer determined burn out duration and/or a higher wheel rotational speed to ensure that the driven tires are optimally warm for maximizing vehicle longitudinal velocity (e.g., by reducing tire slip and vehicle lateral velocity) during a subsequent vehicle launch. Further, the controller may determine a minimum duration of the burn out based on the vehicle performance during the previous launch event that will result in increased (or maximized)

vehicle longitudinal velocity during a next vehicle launch event, decreased (or minimized) vehicle lateral velocity during the next vehicle launch event, decreased (or minimized) vehicle yaw rate during the next vehicle launch event, and reduced tire wear.

In some examples, when the vehicle has not already undergone a launch event during the current key-cycle, the controller may use a default, pre-determined (e.g., pre-calibrated) burn out duration and a pre-determined (e.g., pre-calibrated) driven wheel rotational speed stored in a memory of the controller. In another example, additionally or alternatively, the controller may additionally adjust the pre-determined burn out duration and the pre-determined rear wheel rotational speed based on the estimated tire temperature, the ambient temperature, and the vehicle operating time. For example, when the estimated tire temperature is higher, the ambient temperature is higher, and/or the vehicle operating time is higher, a lower burn out duration and/or tire rotational speed may be used. Conversely, when the estimated tire temperature is lower, the ambient temperature is lower, and/or the vehicle operating time is lower, a higher burn out duration and/or tire rotational speed may be used.

At 312, method 300 includes determining if a burn out event is initiated. As an example, the burn out event may be initiated by the vehicle operator depressing the accelerator pedal while the line-lock is enabled and the brake pedal is no longer depressed (and/or while the brake pressure at the rear wheel brakes is less than or equal to the second threshold brake pressure). Further, in some examples, the burn out event may be initiated in response to the vehicle operator depressing the accelerator pedal at least a threshold amount, such that the burn out event is not initiated when the accelerator pedal is depressed less than the threshold amount. The threshold amount may be a non-zero calibratable value that accounts for operator change of mind and/or bumping of the accelerator pedal not meant to initiate burn out, for example. As another example, the controller may initiate the burn out event once the line-lock is enabled and the brake pedal is no longer depressed (and/or the brake pressure at the rear wheel brakes is less than or equal to the second threshold brake pressure).

If burn out is not initiated, method 300 proceeds to 314 and includes maintaining the driven wheels at rest. For example, the engine may remain at idle and will not be actuated to provide torque to spin the driven wheels.

At 316, method 300 includes determining if the line-lock is enabled, as described above at 304. If the line-lock remains enabled, method 300 returns to 312. Thus, the burn out event may be initiated in response to a signal from the vehicle operator and/or the controller. If the line-lock is no longer enabled, such as when the vehicle operator has deselected the line-lock feature (e.g., by pressing/actuating the line-lock button a second time or by pressing/actuating a cancel button), method 300 proceeds to 324 and includes releasing the brake pressure from the non-driven wheel brakes. For example, the controller may actuate the braking system valves coupled to the non-driven wheel brakes to an open (e.g., fully open) position so that brake fluid may return to the corresponding cylinder, thereby reducing the brake pressure at the non-driven wheel brakes. Further, the controller may actuate the braking system valves coupled to the driven wheel brakes to an open (e.g., fully open) position so that brake fluid may flow from the corresponding cylinder to the driven wheel brakes. Thereafter, the front and rear wheel brakes may be engaged responsive to the braking demand, as at 306.

Returning to 312, if the burn out event is initiated, method 300 proceeds to 318 and includes spinning the driven wheels at the determined rotational speed (e.g., as determined at 310). For example, the engine may be actuated to produce a desired amount of torque for spinning the driven wheels at the determined rotational speed. For example, the controller may input the determined rotational speed into a look-up table, algorithm, or map, which may output the desired amount of torque. The controller may adjust an engine load (e.g., by adjusting a position of a throttle valve), a fuel injecting timing and amount, and/or an ignition timing in order to provide the desired amount of torque for spinning the wheels at the determined rotational speed. Further, at least in some examples, the desired amount of torque to spin the driven wheels at the determined speed during the burn out event may be different from an amount of torque requested by the vehicle operator (e.g., based on the accelerator pedal position). In this way, the controller may precisely control the spinning the driven wheels during the burn out in order to optimally warm up the driven tires for traction while reducing rear tire wear. Further still, in some examples, in response to a non-zero yaw rate during the previous vehicle launch and/or in response to one tire having a greater estimated tire temperature than the other, the controller may adjust the speed of each driven wheel so that one wheel rotates at a faster speed than the other in order to adjust the tire warm up to maintain a straight attitude and/or equalize the tire temperature. For example, the controller may decrease the rotational speed of the hotter tire relative to the cooler tire, such as by using a controlled differential or via an electric motor.

At 320, method 300 includes determining if the burn out duration, as determined at 310, has elapsed. If the burn out duration has not elapsed, method 300 returns to 318 to continue spinning the driven wheels at the determined speed. If the burn out duration has elapsed, method 300 proceeds to 324, and includes releasing brake pressure from the non-driven wheel brakes, as described above. Thus, the vehicle may be exited from operating in the line-lock mode in response to the burn out duration elapsing. Further, in at least in some examples, the controller may decrease the engine torque in response to the burn out duration elapsing. Further still, the controller may gradually release the brake pressure from the non-driven wheel brakes, such as by opening the corresponding valves at a predetermined rate, so that a forward motion of the vehicle upon releasing pressure at the non-driven wheel brakes is not jarring to the vehicle operator (e.g., driver). As such, the vehicle may move forward at a low vehicle speed once the brake pressure at the non-driven wheel brakes is below a pressure for holding the vehicle stationary.

Further, method 300 optionally includes performing a short acceleration after exiting the line-lock mode to confirm tire traction at 324. For example, after releasing the brake pressure from the non-driven wheel brakes, the controller may accelerate the vehicle from rest for a short duration (e.g., in a range from 3-15 seconds). During the acceleration, the controller may measure vehicle parameters, such as vehicle speed measurements, yaw rate, etc., to estimate an amount of tire slip, as described above at 310. As one example, if the amount of tire slip is greater than a threshold amount, the controller may output a message to the driver (e.g., via a vehicle instrument panel, such as vehicle instrument panel 196 of FIG. 1) recommending that the burn out is repeated to further warm the tires and further increase tire traction. The threshold amount may be a non-zero, pre-calibrated amount above which it may be inferred that the tire traction is too low to increase the vehicle longitudinal speed and decrease the vehicle lateral speed and yaw rate during a subsequent vehicle launch event.

At 326, method 300 includes operating the driven wheels responsive to driver demand. For example, the engine torque may be adjusted based on the accelerator pedal position and the brake pressure at both the front (e.g., non-driven) wheel brakes and the rear (e.g., driven) wheel brakes may be adjusted based on the brake pedal position. Following 326, method 300 ends.

Further, if the vehicle is an all-wheel drive vehicle and the second burn out event of the sequence has not been completed, method 300 may be repeated.

Thus, FIG. 3 provides a method for operating a vehicle during a burn out. Further, a controller may make a determination of whether or not to perform the burn out. For example, the burn out may be initiated while operating in a line-lock mode, wherein brake pressure is held at non-driven wheel brakes and released at driven wheel brakes, and may not be initiated outside of the line-lock mode. As one example, the controller initiates the burn out while operating in the line-lock mode in response to an input, such as an accelerator pedal position input and/or a brake pedal position input. Responsive to the burn out being initiated, the controller may adjust engine operation, such as by adjusting engine torque and/or speed, to rotate driven wheels of the vehicles at a desired rotational speed for a desired duration. The controller may determine each of the desired rotational speed and the desired duration based on vehicle performance feedback obtained during a previous vehicle launch event, such as a most recent vehicle launch event. For example, the vehicle performance feedback may include vehicle speed measurements obtained via a plurality of sensors, such as a wheel speed sensor and a radar odometry sensor. Upon the desired duration elapsing, the vehicle may exit the line-lock mode, signaling a completion of the burn out. For example, the brake pressure at the non-driven wheel brakes may be released upon the desired duration elapsing. Further, the engine operation may be adjusted responsive to driver demand upon the desired duration elapsing. In this way, the controller may control an amount of tire warming achieved during the burn out, increasing tire traction and reducing tire wear.

Next, FIG. 4 shows an example method 400 for adjusting a burn out duration and rear wheel speed for performing a subsequent burn out based on speed measurements obtained during a vehicle launch event. The adjusted burn out duration and rear wheel speed determined in method 400 of FIG. 4 may be utilized as part of method 300 of FIG. 3 (e.g., at 310) while performing a burn out. For example, practice runs are often used prior to a race. Therefore, a driver may perform a burn out, ready the vehicle for a practice run (e.g., by driving to a starting line), and launch the vehicle for a practice run. The process may be repeated, with the subsequent burn out parameters adjusted based on measurements made during the previous vehicle launch.

At 402, method 400 includes estimating and/or measuring operating conditions. The operating conditions may include, for example, engine speed and load, vehicle speed, accelerator pedal position (e.g., of accelerator pedal 192 of FIG. 1), brake pedal position (e.g., of brake pedal 191 of FIG. 1), tire pressure from a tire pressure sensor (e.g., TPMS sensor 137 of FIG. 1), etc. For example, the vehicle speed may be measured via a wheel speed sensor (e.g., wheel speed sensor 136 of FIG. 1) and/or by a radar odometry sensor (e.g., radar odometry sensor 198 of FIG. 1). Further, the controller may estimate tire temperature based on the measured tire pressure (e.g., via the ideal gas law). The operating conditions may further include ambient conditions, such as ambient temperature, pressure, and humidity, as well as a vehicle operating time during a current key-cycle (e.g., since a vehicle key-on event, when the vehicle is powered on), a number of burn outs performed during the current key-cycle, an amount of time since the previous burn out, etc. As one example, a tire pressure decrease may be used to estimate the amount of time since the previous burn out was performed. For example, the controller may continuously monitor tire pressure beginning at the end of the previous burn out to determine a decrease in the tire temperature since the previous burn out. The controller may further input the decrease in the tire temperature and the ambient temperature into a look-up table, algorithm, or map, which may output the estimated time since the previous burn out was performed.

At 404, method 400 includes determining if a vehicle launch event is present. The vehicle launch event may refer to accelerating the vehicle from rest for a drag race or practice lap, for example. As an example, a vehicle launch event may be confirmed when the accelerator pedal is depressed by at least a threshold amount and/or at a rate that is greater than or equal to a threshold rate. The threshold amount refers to a non-zero amount of pedal depression indicating a high torque demand. Similarly, the threshold rate refers to a positive, non-zero rate indicating a rapid increase in the torque demand. As another example, additionally or alternatively, a vehicle launch event may be confirmed when the vehicle goes from rest to a non-zero speed and the acceleration is greater than or equal to a threshold acceleration. The threshold acceleration refers to a non-zero, positive acceleration that indicates a large increase in vehicle speed over a short amount of time. As still another example, a launch event may be additionally confirmed if a burn out has been performed within a threshold duration. The threshold duration may be a non-zero time duration that may encompass an amount of time waiting at a starting line for a race or practice lap to begin. As a non-limiting example, the threshold duration may be in a range from 1-5 minutes.

If a vehicle launch event is not present, method 400 proceeds to 406 and includes not adjusting current burn out parameters. For example, the current burn out parameters may be stored, unaltered, in non-transitory memory for later use during a next burn out event. Following 406, method 400 ends.

If a vehicle launch event is present, method 400 proceeds to 408 and includes measuring vehicle launch parameters during the vehicle launch event. For example, the vehicle launch parameters may include vehicle speed values measured by both the wheel speed sensor and the radar odometry sensor. An output of the wheel speed sensor may indicate a rotational speed of an associated vehicle wheel, which the controller may convert into a longitudinal vehicle speed measurement based on a known diameter of the wheel, and an output of the radar odometry sensor may be used to determine longitudinal vehicle speed, lateral vehicle speed, and yaw rate. The radar odometry sensor may give a more accurate measurement of the vehicle speed than the wheel speed sensor because it determines the near real-time movement of the vehicle (e.g., relative to stationary objects around the vehicle) and is not confounded by tire slip, skidding, tire inflation, etc. Therefore, the controller may record time-matched vehicle speed measurements from the wheel speed sensor and the radar odometry sensor to estimate tire slip and skidding based on a comparison between the vehicle speed measured by the wheel speed sensor and the vehicle speed measured by the radar odometry sensor at a given time. For example, the controller may determine a first longitudinal vehicle speed value from the output of the wheel speed sensor at a first time and a second longitudinal vehicle speed value from the output of the radar odometry sensor at the first time. The controller may then compare the first longitudinal vehicle speed value and the second longitudinal vehicle speed value to estimate the longitudinal tire slip. The longitudinal tire slip indicates that the tires are spinning against the road, such as due to reduced traction during the vehicle launch event, when the first longitudinal vehicle speed value is greater than the second longitudinal vehicle speed value. Additionally, an increased longitudinal velocity and an increased yaw rate, as measured by the radar odometry sensor, may also indicate decreased traction during the vehicle launch event.

The vehicle launch parameters may further include a coefficient of friction of a road surface from which the vehicle is launching (e.g., launch surface) and the tire temperature during the vehicle launch. For example, the controller may estimate the coefficient of friction as a function of the engine torque and the rear wheel (e.g., driven wheel) speed during the launch. In some examples, the controller may input the engine torque and the rear wheel speed into a look-up table stored in a memory of the controller, which may output the coefficient of friction. In this way, a coefficient of friction may be determined at each vehicle launch event. The tire temperature may be estimated based on the measured tire pressure, as described above at 402.

At 410, method 400 includes adjusting burn out parameters for a subsequent burn out event based on the measured vehicle launch parameters. The burn out parameters may include the driven wheel speed and the burn out duration, for example, although other parameters are also possible. As an example, the controller may adjust a pre-determined (e.g., pre-calibrated) burn out duration and a pre-determined (e.g., pre-calibrated) driven wheel rotational speed stored in a memory of the controller. In one example, the pre-determined burn out duration and the pre-determined driven wheel rotational speed may be calibrated to under-warm the tires so that the controller may increase the burn out duration and/or the driven wheel speed based on the measured vehicle launch parameters, enabling the controller to tune the burn out duration and the driven wheel rotational speed over iterative rounds of burn out and launch events. For example, as a difference between the first longitudinal vehicle speed (measured by the wheel speed sensor) and the second longitudinal vehicle speed (measured by the radar odometry sensor) increases, one or both of burn out duration and the driven wheel rotational speed may be increased from the pre-determined values. As another example, additionally or alternatively, as the lateral velocity of the vehicle increases, one or both of the burn out duration and the driven wheel rotational speed may be increased from the pre-determined values. As still another example, additionally or alternatively, as a yaw rate of the vehicle increases, one or both of the burn out duration and the driven wheel rotational speed may be increased from the pre-determined values. For example, the controller may input the difference between the longitudinal vehicle speed measured by the wheel speed sensor and the longitudinal vehicle speed measured by the radar odometry sensor, the lateral velocity of the vehicle, and/or the yaw rate of the vehicle into one or more look-up tables, algorithms, or maps, which may output the adjusted burn out parameters for the subsequent burn out, including the adjusted driven wheel rotational speed and the adjusted burn out duration. As another example, the controller may make a logical determination (e.g., regarding adjustments to the burn out parameters, including the driven wheel rotational speed and the burn out duration) based on logic rules that are a function of one or more of the difference between the vehicle speed measured by the wheel speed sensor and the vehicle speed measured by the radar odometry sensor, the lateral velocity of the vehicle, and/or the yaw rate of the vehicle. As another example, the controller may input the estimated coefficient of friction into a look-up table, algorithm, or map and output the adjusted driven wheel rotational speed and the adjusted burn out duration. For example, as the coefficient of friction decreases, the burn out duration and/or the driven wheel rotational speed may be increased. As still another example, the controller may further adjust the burn out parameters for the subsequent burn out event based on the number of burn outs that have been performed during the current key-cycle, the estimated tire temperature, the ambient temperature, and the vehicle operating time. For example, when the estimated tire temperature is higher, the ambient temperature is higher, the vehicle operating time is higher, and/or the number of burn outs performed during the current key-cycle is higher, a lower burn out duration and/or tire rotational speed may be used during the subsequent burn out event to reduce over-warming of the tires. Following 410, method 400 may end.

Thus, the method of FIG. 4 provides a method for adjusting burn out parameters based on vehicle performance feedback received during a vehicle launch in order to heat vehicle tires to a desired temperature for a subsequent vehicle launch. For example, the vehicle performance feedback may include vehicle speed measurements, which may be used to infer a degree of tire slip occurring during the vehicle launch. As an example, the vehicle speed measurements may include a first longitudinal vehicle speed measurement obtained from a wheel speed sensor, a second longitudinal vehicle speed measurement obtained from a radar odometry sensor, and a lateral vehicle speed measurement obtained from the radar odometry sensor. Further, the radar odometry sensor may also measure a yaw rate. As another example, the vehicle performance measurements may include a coefficient of friction of a launch surface. As one example, a controller may make a determination of whether a launch event is occurring, and, in response to the launch event occurring, compare time-matched longitudinal vehicle speed measurements from the wheel speed sensor and the radar odometry sensor. In response to the comparison indicating tire slip, the controller may adjust the burn out parameters, including one or more of a burn out duration and a driven wheel rotational speed, for a subsequent burn out event. As an example, the controller may increase the burn out duration from a pre-calibrated burn out duration stored in memory in response to the comparison indicating tire slip. As another example, additionally or alternatively, the controller may increase the driven wheel rotational speed from a pre-calibrated rotational speed stored in memory in response to the comparison indicating tire slip. In this way, the burn out duration and the driven wheel rotational speed may be adjusted to increase tire traction and increase the longitudinal vehicle speed during a subsequent vehicle launch.

FIG. 5 shows an example timeline 500 for performing a burn out prior to a vehicle launch event and adjusting burn out parameters for a subsequent burn out based on vehicle performance parameters during the vehicle launch event. For example, a controller (e.g., controller 12 shown in FIGS.

1 and 2) may operate the vehicle during the burn out event according to the example method of FIG. 3 and adjust the burn out parameters for the subsequent burn out event based on the vehicle performance parameters during the launch event according to the method of FIG. 4. Example timeline 500 is shown for a rear-wheel drive vehicle. Thus, the rear tires are warmed during the burn out event, and the front tires are not warmed. Note that in examples where the vehicle is an all-wheel drive vehicle, the controller may warm both the rear tires and the front tires by performing a sequence of burn outs prior to the launch event, as described above with respect to FIG. 3.

A first longitudinal vehicle speed is shown in dashed plot 502, a second longitudinal speed is shown in solid plot 504, a lateral speed is shown in dotted plot 506, brake pedal position is shown in dashed plot 508, accelerator pedal position is shown in solid plot 510, an indication of whether line-lock is enabled is shown in plot 512, a front brake pressure is shown in plot 514, a rear brake pressure is shown in plot 516, an indication of whether burn out is initiated is shown in plot 518, and rear wheel speed is shown in plot 520. For all of the above, the horizontal axis represents time, with time increasing along the horizontal axis from left to right. The vertical axis represents each labeled parameter. For plots 502, 504, 506, 508, 510, 514, 516, and 520, a value of each labeled parameter increases along the vertical axis from bottom to top. For plot 512, the vertical axis represents whether line-lock is enabled (e.g., "yes" or "no"), as labeled. For plot 518, the vertical axis represents whether burn out is initiated (e.g., "yes" or "no"), as labeled.

At time t1, the vehicle is at rest. The first longitudinal vehicle speed (dashed plot 502), as measured by a wheel speed sensor (e.g., wheel speed sensor 136 of FIG. 1), and the second longitudinal vehicle speed (plot 504), as measured by a radar odometry sensor (e.g., radar odometry sensor 198 of FIG. 1), are both equal to zero. Furthermore, the lateral vehicle speed (dotted plot 506), as also measured by the radar odometry sensor, is also equal to zero. An operator of the vehicle enables (e.g., activates) line-lock (plot 512), such as by depressing a corresponding line-lock button (e.g., line-lock button 197 of FIG. 1). With the line-lock enabled, the controller may anticipate a burn out event.

Between time t1 and time t2, the operator depresses the brake pedal (dashed plot 508). With the line-lock enabled, the controller actuates braking system valves (e.g., valves 262 and 264 of FIG. 2) in response to the front brake pressure (plot 514) reaching a threshold pressure indicated by dashed line 515. As a result, the front brake pressure (plot 514) is maintained at the threshold pressure (dashed line 515) while the line-lock remains enabled (plot 512). In contrast, the rear brake pressure (plot 516) increases proportionally to the brake pedal position and decreases back to zero as the brake pedal is released.

The operator depresses the accelerator pedal, and at time t2, the accelerator pedal position (plot 510) surpasses a threshold indicated by a dashed line 511 for initiating a burn out (plot 518). In response, the controller increases the rear wheel speed (plot 520), as measured by the wheel speed sensor, to a first desired speed for performing the burn out that is indicated by a dashed line 521a. The rear wheels spin against the pavement, warming and cleaning rear tires coupled to the rear wheels via friction. Due to the rear wheels spinning, the first longitudinal vehicle speed (dashed plot 502) increases proportionally with the rear wheel rotational speed (plot 520) even though the vehicle remains stationary during the burn out. For example, the second longitudinal vehicle speed (plot 504) remains at zero.

The burn out remains initiated for a burn out duration d1, during which the controller controls the engine torque to maintain the rear wheel rotational speed (plot 520) at the first desired speed (dashed line 521a). Upon the duration d1 elapsing at time t3, the burn out event is complete (plot 518), and the line-lock is disabled (plot 512). As a result, the front brake pressure is released (plot 514). The rear tires grip the pavement, reducing the rear wheel speed (plot 520) and propelling the vehicle at a non-zero speed. The first longitudinal vehicle speed (dashed plot 502) decreases as the rear wheels grip the pavement, whereas the second longitudinal vehicle speed (plot 504) decreases back to zero. The lateral vehicle speed (dotted plot 506) remains near zero as the vehicle is propelled in a relatively longitudinal direction. Further, with the burn out complete, the operator decreases the accelerator pedal position (plot 510). In the example of timeline 500, between time t3 and time t4, the operator drives the vehicle to a race track starting line and then depresses the brake pedal (dashed plot 508) to decelerate the vehicle and bring the first longitudinal vehicle speed (dashed plot 502), the second longitudinal vehicle speed (plot 504), and the lateral vehicle speed (dotted plot 506) to zero. Thus, the vehicle is held stationary.

At time t4, the operator further depresses the brake pedal (dashed plot 508) to prepare for a vehicle launch event from the race track starting line. For example, the operator may fully depress the brake pedal. The front brake pressure (plot 514) and the rear brake pressure (plot 516) increase, such as to a maximum brake pressure value. Between time t4 and time t5, the operator partially depresses the accelerator pedal (plot 510) to begin increasing the engine speed in anticipation of the vehicle launch event. In response to a signal to start the race at time t5, the vehicle operator fully releases the brake pedal (dashed plot 508) and further depresses the accelerator pedal (plot 510), such as fully depresses the accelerator pedal. Due to the accelerator pedal position increasing at greater than a threshold rate, for example, the controller recognizes a (first) vehicle launch event and evaluates the vehicle parameters, including the first longitudinal vehicle speed (dashed plot 502), the second longitudinal vehicle speed (plot 504), the lateral vehicle speed (dotted plot 506), and yaw rate (not shown) during the vehicle launch event. In the example of timeline 500, the first longitudinal vehicle speed (dashed plot 502) is greater than the second longitudinal vehicle speed (plot 504), indicating that tire slip is occurring. Further, the lateral vehicle speed (dotted plot 506) is non-zero. Therefore, the controller adjusts the burn out parameters for the next burn out event, increasing both the burn out duration and the desired rear wheel rotational speed. The controller may determine that the vehicle launch event is over when the vehicle speed remains relatively constant, for example.

At time t6, the vehicle is again at rest, with the first longitudinal vehicle speed (dashed plot 502), the second longitudinal vehicle speed (plot 504), and the lateral vehicle speed (dotted plot 506) all equal to zero. The operator again activates the line-lock feature (plot 512) to perform another burn out, such as prior to a second race or practice lap, for example. The operator depresses the brake pedal (dashed plot 508) between time t6 and time t7 to increase both the front brake pressure (plot 514) and the rear brake pressure (plot 516). With the line-lock enabled, the controller actuates the corresponding braking system valves (e.g., valves 262 and 264 of FIG. 2) in response to the front brake pressure (plot 514) reaching the threshold pressure (dashed line 515)

to maintain the front brake pressure at the threshold pressure. In the example of timeline 500, the rear brake pressure (plot 516) increases proportionally to the brake pedal position and decreases back to zero as the brake pedal is released. However, in other examples, the line-lock feature may prevent brake pressure from building at the rear brakes, as described above with respect to FIG. 3.

The operator depresses the accelerator pedal, and at time t7, the accelerator pedal position (plot 510) surpasses the threshold for initiating a burn out (dashed line 511). In response, the controller initiates a burn out (plot 518) and increases the rear wheel rotational speed (plot 520) to a second desired rotational speed for performing the burn out that is indicated by a dashed line 521b. The second desired rotational speed (dashed line 521b) is greater than the first desired rotational speed (dashed line 521a), as adjusted by the controller based on the vehicle performance parameters measured during the vehicle launch event initiated at time t5. The rear wheels again spin against the pavement, further warming and cleaning the rear tires. The first longitudinal vehicle speed (dashed plot 502) increases proportionally with the rear wheel rotational speed (plot 520) even though the vehicle remains stationary during the burn out, and the second longitudinal vehicle speed (plot 504) remains at zero.

The burn out remains initiated for a burn out duration d2, which is greater than the burn out duration d1, as adjusted by the controller based on the vehicle performance parameters measured during the vehicle launch event initiated at time t5. During the burn out duration d2, the controller controls the engine torque to maintain the rear wheel rotational speed (plot 520) at the second desired rotational speed (dashed line 521b). Upon the duration d2 elapsing at time t8, the burn out event is complete (plot 518), and the line-lock feature is disabled (plot 512). As a result, the front brake pressure is released (plot 514). The rear tires grip the pavement, reducing the rear wheel speed (plot 520) and propelling the vehicle at a non-zero speed. The first longitudinal vehicle speed (dashed plot 502) decreases as the rear wheels grip the pavement, whereas the second longitudinal vehicle speed (plot 504) decreases from zero. The lateral vehicle speed (dotted plot 506) remains near zero as the vehicle is again propelled in a relatively longitudinal direction. Further, with the burn out complete, the operator decreases the accelerator pedal position (plot 510). The operator drives the vehicle to the race track starting line between time t8 and time t9. Once at the starting line, the operator depresses the brake pedal (dashed plot 508) to decelerate the vehicle and bring the first longitudinal vehicle speed (dashed plot 502), the second longitudinal vehicle speed (plot 504), and the lateral vehicle speed (dotted plot 506) to zero.

At time t9, the operator fully depresses the brake pedal (dashed plot 508) to prepare for a (second) vehicle launch event from the race track starting line. The front brake pressure (plot 514) and the rear brake pressure (plot 516) increase accordingly. Between time t9 and time t10, the operator partially depresses the accelerator pedal (plot 510) to begin increasing the engine speed in anticipation of the vehicle launch event. In response to a signal to start the race at time t10, the vehicle operator fully releases the brake pedal (dashed plot 508) and fully depresses the accelerator pedal (plot 510). Due to the accelerator pedal position increasing at greater than the threshold rate, the controller recognizes a vehicle launch event and evaluates the vehicle parameters, including the first longitudinal vehicle speed (dashed plot 502), the second longitudinal vehicle speed (plot 504), the lateral vehicle speed (dotted plot 506), and yaw rate (not shown) during the vehicle launch event. A difference between the first longitudinal vehicle speed (dashed plot 502) and the second longitudinal vehicle speed (plot 504) is less than during the first launch event initiated at time t5, indicating that a smaller amount of tire slip is occurring. Further, the lateral vehicle speed (dotted plot 506) less than during the first launch event initiated at time t5. Further still, the second longitudinal speed (plot 504) increases at a greater rate than during the first launch event initiated at time t5.

In this way, by adjusting burn out parameters for a burn out event based on vehicle performance parameters measured during a prior vehicle launch event, tire slip and vehicle lateral speed during a subsequent vehicle launch event are reduced. As a result, a vehicle longitudinal speed during the subsequent vehicle launch may be increased. Further, by controlling the burn out parameters via the controller and not via a vehicle operator, operator judgement and skill may not affect an amount of tire warming achieved. By controller-optimizing the burn out duration and rear wheel rotational speed using vehicle performance feedback, rear tire traction may be increased while rear tire wear is reduced. As a result, vehicle launch performance and rear tire life may be increased.

The technical effect of adjusting burn out parameters, including a rear wheel rotational speed and a duration over which the burn out is performed, based on vehicle performance measurements obtained during a vehicle launch is that tire traction may be increased following the burn out while tire wear is reduced.

As one example, a method comprises: while locking non-driven wheel brakes, adjusting a spinning of driven wheels based on a vehicle performance during a previous vehicle launch. In the preceding example, additionally or optionally, the adjusting the spinning of the driven wheels includes adjusting at least one of a rotational speed of the driven wheels and a duration of the spinning, and the method further comprises releasing the non-driven wheel brakes in response to the duration of the spinning elapsing. In one or both of the preceding examples, the method additionally or optionally further comprises, in response to the duration of the spinning elapsing, accelerating the vehicle for a duration; and estimating an amount of tire slip based on vehicle speed measurements obtained during the duration. In any or all of the preceding examples, additionally or optionally, the vehicle performance during the previous vehicle launch includes a first longitudinal vehicle speed measurement and a second longitudinal vehicle speed measurement, the first longitudinal vehicle speed measurement and the second longitudinal vehicle speed measurement including time-matched values obtained from a first sensor and a second sensor, respectively, during the previous vehicle launch. In any or all of the preceding examples, additionally or optionally, the first sensor is a wheel speed sensor and the second sensor is a radar odometry sensor, and the previous vehicle launch includes an acceleration of the vehicle from rest that is greater than a threshold acceleration. In any or all of the preceding examples, additionally or optionally, the adjusting at least one of the rotational speed of the driven wheels and the duration of the spinning includes increasing at least one of the rotational speed of the driven wheels and the duration of the spinning as a difference between the first longitudinal vehicle speed measurement and the second longitudinal vehicle speed measurement increases. In any or all of the preceding examples, additionally or optionally, the vehicle performance during the previous vehicle launch further includes a coefficient of friction measurement obtained during the previous vehicle launch, a lateral vehicle speed measurement determined from an output of the radar odometry sensor obtained during the previous vehicle launch, and a yaw rate measurement determined from the output of the radar odometry sensor obtained during the previous vehicle launch. In any or all of the preceding examples, additionally or optionally, the adjusting at least one of the rotational speed of the rear wheels and the duration of the spinning includes increasing at least one of the rotational speed of the driven wheels and the duration of the spinning as the lateral vehicle speed measurement and/or the yaw rate measurement increases. In any or all of the preceding examples, additionally or optionally, the driven wheels alternate between front vehicle wheels and rear vehicle wheels based on a drive mode selection and whether a first disconnect clutch or a second disconnect clutch is engaged.

As another example, a method comprises: measuring launch performance parameters during a launch event of a vehicle via a wheel speed sensor and a radar odometry sensor; and adjusting burn out parameters for a next burn out event based on the measured launch performance parameters. In the preceding example, additionally or optionally, the burn out parameters include a driven wheel rotational speed during the burn out and a burn out duration, and the launch event includes accelerating the vehicle from rest at a greater than threshold acceleration before a threshold duration elapses since a previous burn out event. In one or both of the preceding examples, additionally or optionally, the launch performance parameters include a first vehicle speed and a second vehicle speed, the first vehicle speed and the second vehicle speed including time-matched longitudinal vehicle speed measurements from the wheel speed sensor and the radar odometry sensor, respectively. In any or all of the preceding examples, additionally or optionally, adjusting the burn out parameters for the next burn out event based on the measured launch performance parameters include adjusting one or more of the driven wheel rotational speed during the burn out and the burn out duration based on a difference between the first vehicle speed and the second vehicle speed. In any or all of the preceding examples, additionally or optionally, the launch performance parameters further include a lateral vehicle speed and a yaw rate, each of the lateral vehicle speed and the yaw rate measured via the radar odometry sensor, and wherein adjusting the burn out parameters for the next burn out event based on the measured launch performance parameters includes further adjusting one or more of the driven wheel rotational speed during the burn out and the burn out duration based on the lateral vehicle speed and the yaw rate. In any or all of the preceding examples, the method additionally or optionally further comprises, during the next burn out event, spinning driven wheels of the vehicle at the adjusted driven wheel rotational speed for the adjusted burn out duration while holding non-driven wheels of the vehicle stationary for the adjusted burn out duration.

As another example, a system comprises: an engine configured propel a vehicle via a plurality of wheels, the plurality of wheels including one or more front wheels and one or more rear wheels; a braking system, including a brake module coupled to each of the plurality of wheels; and a controller storing executable instructions in non-transitory memory that, when executed, cause the controller to: operate the braking system in a line-lock mode in response to an input from a vehicle operator; and while operating the braking system in the line-lock mode, spin the rear wheels at a desired speed until a threshold duration is reached, each of the desired speed and the threshold duration adjusted based on sensor measurements obtained during a most recent vehicle launch event. In the preceding example, additionally or optionally, the one or more rear wheels are driven wheels and the one or more front wheels are non-driven wheels, and the instructions that cause the controller to operate the braking system in the line-lock mode include further executable instructions in non-transitory memory that, when executed, cause the controller to: maintain brake pressure at the brake module coupled to each of the one or more front wheels while releasing brake pressure at the brake module coupled to each of the one or more rear wheels. In one or both of the preceding examples, additionally or optionally, the controller stores further executable instructions in non-transitory memory that, when executed, cause the controller to: release the brake pressure at the brake module coupled to each of the one or more front wheels in response to the threshold duration elapsing; and adjust the brake pressure at the brake module coupled to each of the plurality of wheels based on a position of a brake pedal after the threshold duration elapses. In any or all of the preceding examples, the system additionally or optionally further comprises a wheel speed sensor coupled to one or more of the plurality of wheels and a radar odometry sensor, and wherein the sensor measurements obtained during the most recent vehicle launch event include time-matched vehicle speed measurements made by the wheel speed sensor and the radar odometry sensor. In any or all of the preceding examples, the system additionally or optionally further comprises a pressure sensor coupled to a tire of each of the plurality of wheels, and wherein the sensor measurements obtained during the most recent vehicle launch event further include a tire pressure measured by the pressure sensor coupled to the tire of each of the plurality of wheels, and wherein the controller stores further executable instructions in non-transitory memory that, when executed, cause the controller to: estimate a temperature of each tire based on the tire pressure measured by the pressure sensor coupled to the tire of each of the plurality of wheels.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   while locking non-driven wheel brakes and maintaining a vehicle stationary, receiving a request initiating a burn out event, and delivering an amount of torque to driven wheels to spin the driven wheels of the vehicle for a predetermined duration while preventing the vehicle from launching by maintaining the vehicle stationary and the non-driven wheel brakes locked,
   wherein spinning the driven wheels of the vehicle for the predetermined duration responsive to the request initiating the burn out event includes heating the driven wheels to a desired temperature prior to the launching of the vehicle;
   where parameters for the spinning of the driven wheels during the burn out event, including the predetermined duration for spinning of the driven wheels and the amount of torque delivered to the driven wheels during the burn out event, are parameters that have already been adjusted based on a vehicle performance during a previous vehicle launch;
   wherein the parameters have already been adjusted at least by individually increasing or decreasing a speed of the driven wheels to reach toward equalized tire temperatures and maintain a straight attitude in response to the vehicle performance during the previous vehicle launch; and
   after completing the burn out event, carrying out a launch event by releasing the non-driven wheel brakes in response to the predetermioned duration of the spinning elapsing and launching the vehicle.

2. The method of claim 1, wherein the request initiating the burn out event includes depression of an accelerator pedal while a line-lock is enabled and a brake pedal is not depressed.

3. The method of claim 1, further comprising:
   in response to the predetermined duration of the spinning elapsing, accelerating the vehicle for a duration; and
   estimating an amount of tire slip based on vehicle speed measurements obtained during the predetermined duration.

4. The method of claim 1, wherein the vehicle performance during the previous vehicle launch includes a first longitudinal vehicle speed measurement and a second longitudinal vehicle speed measurement, the first longitudinal vehicle speed measurement and the second longitudinal vehicle speed measurement including time-matched values obtained from a first sensor and a second sensor, respectively, during the previous vehicle launch.

5. The method of claim 4, wherein the adjusting at least one of the rotational speed of the driven wheels and the predetermined duration of the spinning includes increasing at least one of the rotational speed of the driven wheels and the predetermined duration of the spinning as a difference between the first longitudinal vehicle speed measurement and the second longitudinal vehicle speed measurement increases.

6. The method of claim 4, wherein the vehicle performance during the previous vehicle launch further includes a coefficient of friction measurement obtained during the previous vehicle launch, a lateral vehicle speed measurement determined from an output of the radar odometry sensor obtained during the previous vehicle launch, and a yaw rate measurement determined from the output of the radar odometry sensor obtained during the previous vehicle launch.

7. The method of claim 6, wherein the adjusting at least one of the rotational speed of the rear wheels and the duration of the spinning includes increasing at least one of the rotational speed of the driven wheels and the duration of the spinning as the lateral vehicle speed measurement and/or the yaw rate measurement increases.

8. The method of claim 1, wherein the driven wheels alternate between front vehicle wheels and rear vehicle wheels based on a drive mode selection and whether a first disconnect clutch or a second disconnect clutch is engaged.

9. A method, comprising:
   determining a request for a vehicle launch event, and accelerating a vehicle from rest in response to determining the request for the vehicle launch event;
   measuring launch performance parameters including tire slip during the vehicle launch event of the vehicle via a wheel speed sensor and a radar odometry sensor;
   adjusting burn out parameters for a burn out event that is a next burn out event following the vehicle launch event, where the burn out parameters for the burn out event are adjusted based on the measured launch performance parameters, and where the adjusted burn out parameters include a predetermined duration for the burn out event and an amount of torque to deliver to spin driven wheels of the vehicle for the burn out event;
   wherein the burn out parameters are adjusted at least by individually increasing or decreasing a speed of the driven wheels to reach toward equalized tire temperatures and maintain a straight attitude in response to vehicle performance during the previous vehicle launch event;
   determining a request to initiate the burn out event, and performing the burn out event with the adjusted burn out parameters responsive to determining the request to initiate the burn out event, wherein performing the burn out event includes preventing the vehicle from launching by locking wheel brakes of non-driven wheels, and delivering the amount of torque to spin the driven wheels of the vehicle for the predetermined duration based on the adjusted burn out parameters while the wheel brakes of the non-driven wheels are locked and the vehicle is maintained substantially stationary;

wherein spinning the driven wheels of the vehicle for the predetermined duration includes heating the driven wheels to a desired teemperature prior to the next vehicle launch event; and performing a next vehicle launch event of the vehicle responsive to completion of the burn out event.

10. The method of claim 9, wherein the launch event includes accelerating the vehicle from rest at a greater than threshold acceleration before a threshold duration elapses since a previous burn out event.

11. The method of claim 10, further comprising:
during the next burn out event, spinning driven wheels of the vehicle at the adjusted driven wheel rotational speed for the adjusted burn out duration while holding non-driven wheels of the vehicle stationary for the adjusted burn out duration.

12. The method of claim 10, wherein the launch performance parameters include a first vehicle speed and a second vehicle speed, the first vehicle speed and the second vehicle speed including time-matched longitudinal vehicle speed measurements from the wheel speed sensor and the radar odometry sensor, respectively.

13. The method of claim 12, wherein adjusting the burn out parameters for the next burn out event based on the measured launch performance parameters include adjusting one or more of the driven wheel rotational speed during the burn out and the burn out duration based on a difference between the first vehicle speed and the second vehicle speed.

14. The method of claim 13, wherein the launch performance parameters further include a lateral vehicle speed and a yaw rate, each of the lateral vehicle speed and the yaw rate measured via the radar odometry sensor, and wherein adjusting the burn out parameters for the next burn out event based on the measured launch performance parameters includes further adjusting one or more of the driven wheel rotational speed during the burn out and the burn out duration based on the lateral vehicle speed and the yaw rate.

15. A system, comprising:
an engine configured to propel a vehicle via a plurality of wheels, the plurality of wheels including one or more front wheels and one or more rear wheels;
a braking system, including a brake module coupled to each of the plurality of wheels; and
a controller storing executable instructions in non-transitory memory that, when executed, cause the controller to:
determine a request for a vehicle launch event, and accelerate the vehicle from rest in response to determining the request for the vehicle launch event; then
operate the braking system in a line-lock mode in response to an input from a vehicle operator, where the line-lock mode includes locking each non-driven wheel of the vehicle using the brake module; and
while operating the braking system in the line-lock mode and maintaining the vehicle stationary with each non-driven wheel locked, determinethat a request for initiating a burn out is received, and deliver an amount of torque to spin the rear wheels at a desired speed while preventing the vehicle from launching by maintaining the vehicle stationary with each non-driven wheel locked until a predetermined threshold duration is reached responsive to determining the request for initiating the burn out is received, each of the amount of torque to deliver the desired speed and the predetermined threshold duration adjusted based on sensor measurements obtained during the vehicle launch event, where the vehicle launch event is a most recent vehicle launch event, and where the adjusting includes adjusting each of the amount of torque delivered to provide the desired speed and the threshold duration based on a tire temperature estimation that is inferred from the sensor measurements;
wherein spinning the driven wheels of the vehicle until the predetermined threshold duration is reached includes heating the driven wheels to a desired temperature prior to the launching of the vehicle;
wherein the adjusting includes at least individually increasing or decreasing a speed of the driven wheels to reach toward equalized tire temperatures and maintain a straight attitude in response to vehicle performance during the most recent vehicle launch event; and
after completion of the burn out event, release the brake module coupled to each non-driven wheel of the plurality of wheels in response to the predetermined duration of the spinning elapsing and launching the vehicle in a further vehicle launch event.

16. The system of claim 15, wherein the request for the vehicle launch is determined based on an accelerator pedal being depressed by at least a threshold amount and/or the accelerator pedal being depressed at a rate that is greater than or equal to a threshold rate, and wherein the one or more rear wheels are driven wheels and the one or more front wheels are non-driven wheels, and the instructions that cause the controller to operate the braking system in the line-lock mode include further executable instructions in non-transitory memory that, when executed, cause the controller to:
maintain brake pressure at the brake module coupled to each of the one or more front wheels while releasing brake pressure at the brake module coupled to each of the one or more rear wheels.

17. The system of claim 16, wherein the controller stores further executable instructions in non-transitory memory that, when executed, cause the controller to:
release the brake pressure at the brake module coupled to each of the one or more front wheels in response to the threshold duration elapsing; and
adjust the brake pressure at the brake module coupled to each of the plurality of wheels based on a position of a brake pedal after the threshold duration elapses; and
adjust the brake pressure at the brake module coupled to each of the plurality of wheels based on a position of a brake pedal after the predetermined threshold duration elapses.

18. The system of claim 15, further comprising a wheel speed sensor coupled to one or more of the plurality of wheels and a radar odometry sensor, and wherein the sensor measurements obtained during the most recent vehicle launch event include time-matched vehicle speed measurements made by the wheel speed sensor and the radar odometry sensor.

19. The system of claim 15, further comprising a pressure sensor coupled to a tire of each of the plurality of wheels, and wherein the sensor measurements obtained during the most recent vehicle launch event further include a tire pressure measured by the pressure sensor coupled to the tire of each of the plurality of wheels, and wherein the controller stores further executable instructions in non-transitory memory that, when executed, cause the controller to:
estimate a temperature of each tire based on the tire pressure measured by the pressure sensor coupled to the tire of each of the plurality of wheels.

* * * * *